No. 894,594. PATENTED JULY 28, 1908.
M CANI.
HOSE COUPLING.
APPLICATION FILED DEC. 19, 1907.

2 SHEETS—SHEET 1.

Witnesses
J. C. Turner
Frank Krenek

Inventor
Michal Cani
By N. C. Merkel
Attorney

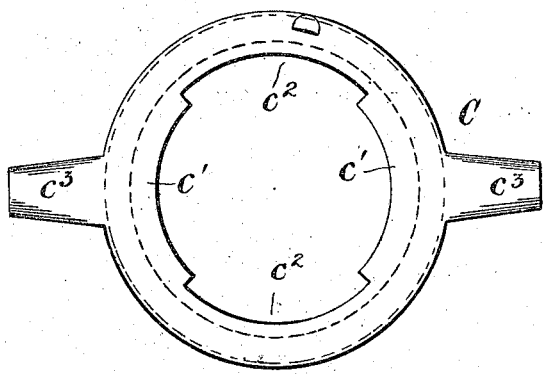
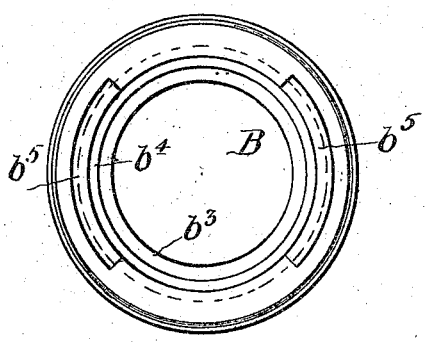
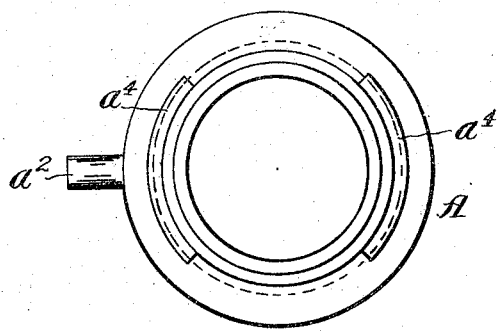

UNITED STATES PATENT OFFICE.

MICHAL CANI, OF CLEVELAND, OHIO.

HOSE-COUPLING.

No. 894,594.

Specification of Letters Patent.

Patented July 28, 1908.

Application filed December 19, 1907. Serial No. 407,134.

*To all whom it may concern:*

Be it known that I, MICHAL CANI, a subject of the Emperor of Austria-Hungary, resident of Cleveland, county of Cuyahoga, and State of Ohio, have invented a new and useful Improvement in Hose-Couplings, of which the following is a specification, the principle of the invention being herein explained and the best mode in which I have contemplated applying that principle so as to distinguish it from other inventions.

My invention relates to hose couplings and particularly to couplings adapted for use in connecting together sections of fire hose.

The object of said invention is to provide a coupling economical in construction and efficient in its operation, and it consists of means hereinafter fully described and particularly set forth in the claims.

The annexed drawings and the following description set forth in detail, certain mechanism embodying the invention, the disclosed means constituting but one of various mechanical forms in which the principle of the invention may be applied.

Figure 1:
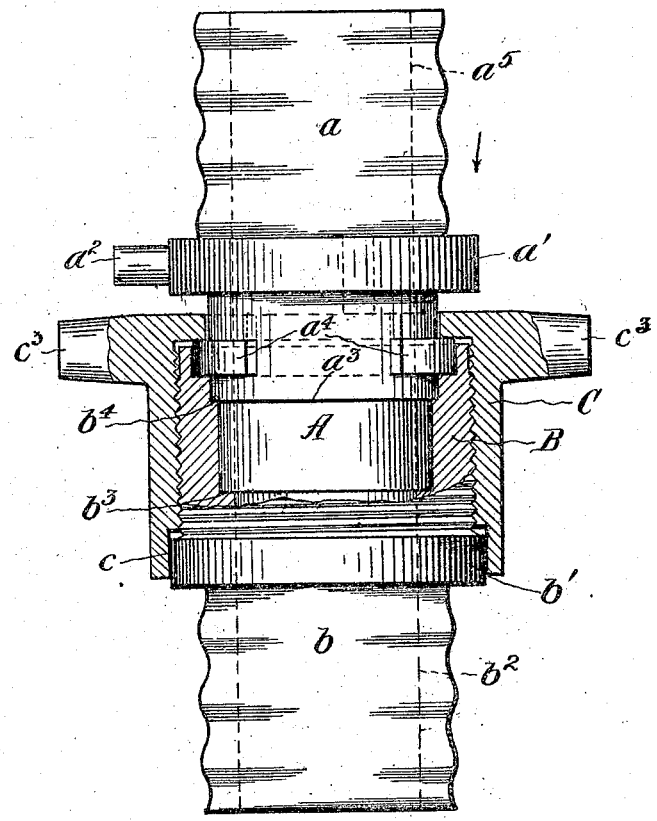
Figure 2:
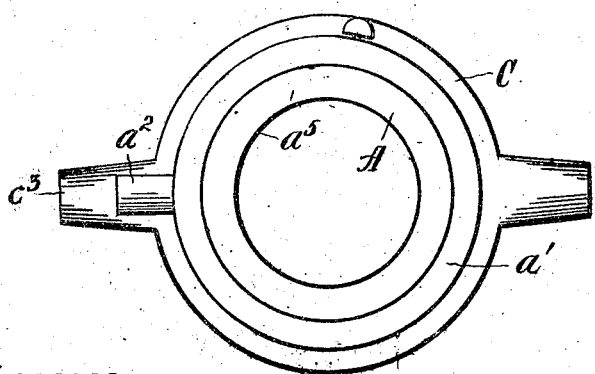

In said annexed drawings:—Figure 1 represents a partial axial section and elevation of a coupling embodying my invention. Fig. 2 represents an end elevation of the coupling viewed in the direction indicated by the arrow in Fig. 1. Fig. 3 represents an end elevation of the coupling sleeve viewed in the direction indicated by the said arrow. Fig. 4 represents an end elevation of the female member of the coupling viewed in the direction indicated by said arrow, Fig. 5 represents an end elevation of the male member of the coupling viewed in the direction opposite that indicated by said arrow.

The coupling consists of three parts; the male member A, the female member B and the coupling sleeve C, Fig. 1.

The male member A is provided with the usual corrugated nipple $a$ to which the hose is directly attached. Adjacent to said nipple is formed a shoulder $a'$ to which is secured a pin $a^2$ for receiving a spanner-wrench. Intermediately of the shoulder $a'$ and the inner end of the member A is formed a shoulder $a^3$ and intermediately of this shoulder and the shoulder $a'$ are formed two segmental lugs $a^4 a^4$. The said member is further formed with an axial bore $a^5$.

The female member B is formed with the usual corrugated nipple $b$ for directly receiving the hose, and adjacent thereto is formed a cylindrical shoulder $b'$. That portion of this member intermediate of the shoulder $b^8$ and the inner end thereof is externally threaded, as shown. A bore $b^2$ is provided in this member and has its inner end countersunk to form a seat $b^3$ and a seat $b^4$, Fig. 1. The distance between these seats measured along the axis of the bore is made equal to the distance between the inner end of member A and the shoulder $a^3$. The counterbores are made of diameters respectively equal to the diameter of the inner end of member A and the diameter thereof immediately adjacent to the shoulder $a^3$. It will therefore be noted that the member A may be inserted in the counterbored portion of member B and that the inner end of member A and the shoulder $a^3$ may be seated simultaneously upon the seats $b^3 b^4$ respectively. The inner end of the female member is further formed with two segmental recesses $b^5 b^5$, Fig. 4, which are of dimensions such as to snugly receive the segmental lugs $a^4 a^4$ of the male member. When these lugs are seated in the said recesses it will be noted that the two members A and B are fixed in the direction of rotation about their common axis. The outer end of bore $b^2$ is made of the same diameter as the bore $a^5$, as shown in dotted lines in Fig. 1.

The coupling sleeve C is internally threaded to engage the threads on the female member B, and the inner end is counterbored at $c$ to snugly receive the shoulder $b'$ of the female member. The opposite end is formed with a flange $c'$ which is formed with two diametrically opposite segmental recesses $c^2$ which are adapted to permit the lugs $a^4 a^4$ to pass through them. Two laterally extending lugs $c^3 c^3$ are formed integrally with the member C for the reception of the wrench or for permitting the rotation of the sleeve manually.

In operation sleeve C is mounted upon the female member and when it is desired to form the connection between the two hose sections, the male member is passed through the sleeve C and placed in the female member so as to allow the recesses $b^5 b^5$ to receive the lugs $a^4$, the sleeve being turned to a position in which the recesses $c^2$ register with the recesses $b^5$. Sleeve C is then turned so as to cause the flange $c'$ to engage the lugs $a^4 a^4$ thereby clamping the two members A and B firmly together in the direction of their common axis. The engagement of the collar $b'$ with the counterbore $c$ prevents any wabbling of member B which might be due to the easy fit of the threads thereof in the threads of member C. Such looseness is required in order that the member C may be easily turned by hand.

Other modes of applying the principle of my invention may be employed, instead of the one explained, and change may be made as regards the mechanism herein disclosed, provided the means covered by the following claim be employed.

I, therefore, particularly point out and distinctly claim as my invention:—

In a hose coupling, the combination of a male member, a female member provided with an outside thread, said two members arranged to interlock so as to be rotatively fixed, and an internally threaded clamping sleeve engaging said outside thread and adapted to clamp said male and female members in the direction of their common axes; said female member being further provided with a cylindrical collar intermediate of its ends, and said sleeve formed with a countersunk portion for receiving said collar.

Signed by me, this 18th day of December, 1907.

MICHAL CANI.

Attested by—
 JENNIE E. GARY,
 LENA A. DIRLAM.